(12) United States Patent
Möbus et al.

(10) Patent No.: US 8,921,612 B2
(45) Date of Patent: Dec. 30, 2014

(54) SUPPORTED NOBLE METAL CATALYST

(75) Inventors: Konrad Möbus, Grosskrotzenburg (DE); Tracy Dunn, Murray, KY (US); Baoshu Chen, Frankfurt (DE)

(73) Assignee: Evonik Degussa GmbH, Essen (DE)

( * ) Notice: Subject to any disclaimer, the term of this patent is extended or adjusted under 35 U.S.C. 154(b) by 743 days.

(21) Appl. No.: 12/595,513

(22) PCT Filed: Mar. 10, 2008

(86) PCT No.: PCT/EP2008/052831
§ 371 (c)(1),
(2), (4) Date: Oct. 29, 2009

(87) PCT Pub. No.: WO2008/125396
PCT Pub. Date: Oct. 23, 2008

(65) Prior Publication Data
US 2010/0210881 A1   Aug. 19, 2010

(30) Foreign Application Priority Data
Apr. 12, 2007   (DE) .................. 10 2007 017 182

(51) Int. Cl.
*C07C 41/01* (2006.01)
*B01J 21/18* (2006.01)
*B01J 23/44* (2006.01)
*B01J 13/02* (2006.01)
*B01J 37/03* (2006.01)
*B01J 35/00* (2006.01)
*B01J 37/02* (2006.01)
*B01J 37/18* (2006.01)

(52) U.S. Cl.
CPC *B01J 23/44* (2013.01); *B01J 13/02* (2013.01); *B01J 21/18* (2013.01); *B01J 37/031* (2013.01); *B01J 35/0013* (2013.01); *B01J 37/0211* (2013.01); *B01J 37/18* (2013.01); *Y10S 977/742* (2013.01)
USPC .................... 568/659; 502/185; 977/742

(58) Field of Classification Search
USPC .................... 568/659; 502/185; 977/742
See application file for complete search history.

(56) References Cited

U.S. PATENT DOCUMENTS

| 1,739,306 A | 12/1929 | Holmes |
| 2,857,337 A * | 10/1958 | Hamilton et al. ............. 502/326 |
| 3,271,327 A | 9/1966 | McEvoy et al. |
| 3,804,779 A | 4/1974 | Kent et al. |

(Continued)

FOREIGN PATENT DOCUMENTS

| CN | 1748860 A | 3/2006 |
| EP | 1 238 700 A1 | 9/2002 |
| WO | WO 2006/133081 A2 | 12/2006 |

OTHER PUBLICATIONS

Examination Report for corresponding Indian patent application 649/KOL/2008, dated May 24, 2011.

(Continued)

*Primary Examiner* — Rosalynd Keys
(74) *Attorney, Agent, or Firm* — Law Office of: Michael A. Sanzo, LLC

(57) ABSTRACT

A supported noble metal catalyst comprising palladium salts enveloped by colloids applied to the support is produced by hydrolysing a palladium salt solution by means of a base and applying the colloidal suspension to a support. The catalyst can be used in hydrogenations.

20 Claims, 1 Drawing Sheet

Reduction of the chloro-hydroxy-palladium colloids to Pd(0) and HCl

(56) References Cited

U.S. PATENT DOCUMENTS

| | | |
|---|---|---|
| 6,624,112 B2 | 9/2003 | Hasegawa et al. |
| 6,686,308 B2 | 2/2004 | Mao et al. |
| 6,818,720 B2 | 11/2004 | Krauter et al. |
| 6,992,037 B2 | 1/2006 | Chen et al. |
| 2002/0169074 A1 | 11/2002 | Hasegawa et al. |
| 2003/0060361 A1 | 3/2003 | Chen et al. |
| 2003/0104936 A1 | 6/2003 | Mao et al. |
| 2005/0009696 A1 | 1/2005 | Mao et al. |
| 2005/0221976 A1 | 10/2005 | Chen et al. |

OTHER PUBLICATIONS

English language abstract for CN 1748860 A, listed as document B1 above.

International Preliminary Report on Patentability for PCT/EP2008/052831 filed Mar. 10, 2008.

International Search Report for PCT/EP2008/052831 filed Mar. 10, 2008.

Written Opinion of the International Searching Authority for PCT/EP2008/052831 filed Mar. 10, 2008.

Sajiki, "Selective inhibition of benzyl ether hydrogenolysis with Pd/C due to the presence of ammonia, pyridine or ammonium acetate," *Tetrahedron Letters* 36(20):3465-3468 (1995).

Studer, et al., "Influence of catalyst type, solvent, acid and base on the selectivity and rate in the catalytic debenzylation of 4-chloro-*N,N*-dibenzyl aniline with Pd/C and $H_2$," *Journal of Molecular Catalysis A: Chemical* 112(3):437-445 (1996).

\* cited by examiner

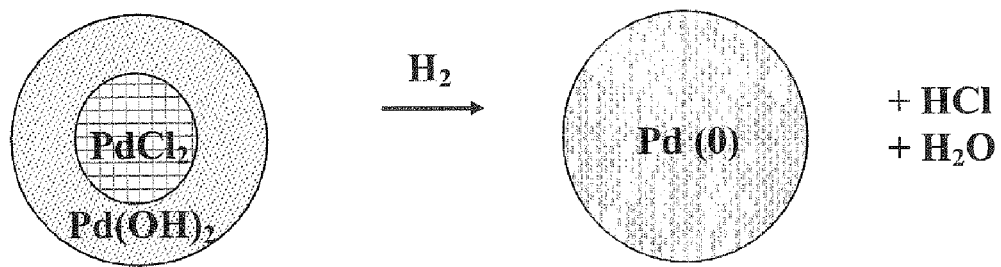
Figure 1: Reduction of the chloro-hydroxy-palladium colloids to Pd(0) and HCl
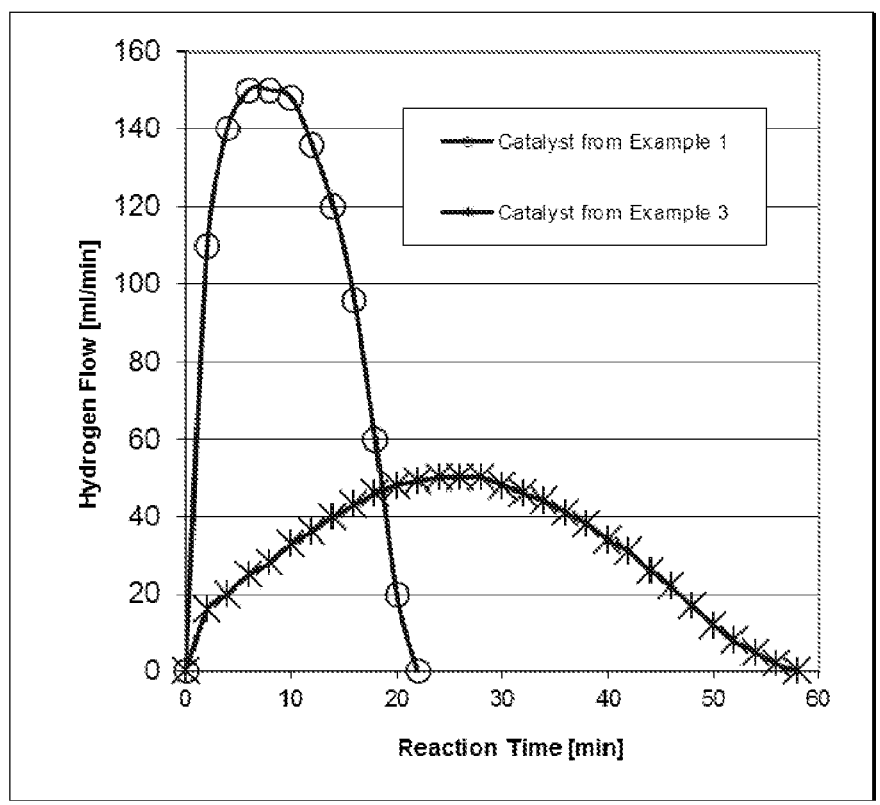
Figure 2: Hydrogen uptake vs. time curve in the hydrogenation of dibenzyl ether.

SUPPORTED NOBLE METAL CATALYST

CROSS REFERENCE TO RELATED APPLICATIONS

The present application is US national stage of international application PCT/EP2008/052831, which had an international filing date of Mar. 10, 2008, and which claimed priority to German application 102007017182.1, filed on Apr. 12, 2007. The international application was published in English under PCT Article 21(2) on Oct. 23, 2008. All prior applications are hereby incorporated by reference in their entirety.

The present invention relates to a supported noble metal catalyst, a process for producing it and its use.

Catalysts are used in chemical processes to increase the reaction rate. The catalyst reduces the activation energy and thus makes the reaction faster.

The addition of additional auxiliaries to effect an additional increase in the activity is known for various reactions. The type of auxiliaries depends on the particular reaction. Thus, for example, the addition of acids to the reaction medium in hydrogenation in order to increase the selectivities and activities is known.

This is known, for example, for the debenzylation of benzyl ethers and benzylamines or the selective hydrogenation of organic nitriles to amines.

The debenzylation of benzyl ethers proceeds very tardily or is completely inhibited under neutral to basic conditions (H. Sajiki, Tetrahedron Letters 36, 1995, 3465). The addition of acid can accelerate the reaction.

U.S. Pat. No. 6,992,037 gives a general description of debenzylations under acid conditions in the presence of polar solvents, a low hydrogen pressure and relatively high temperatures. Typical reaction conditions are a reaction temperature in the range from 5° C. to 100° C., a hydrogen pressure of from 1 to 10 bar and alcohols or acidic solvents.

U.S. Pat. No. 6,992,037 describes the production of palladium on activated carbon catalysts, in which sodium tetrachloropalladate is brought to a pH of 8 by means of sodium carbonate solution. This pH and the use of the relatively weak base sodium carbonate results in complete conversion of the palladium chloride into palladium hydroxide. However, no mention is made of the presence of palladium chloride, which is an important aspect of the present invention.

It is also known from the literature that the type of catalyst has a strong influence on the debenzylation reaction (Studer, Martin; Blasser, Hans-Ulrich, Journal of Molecular Catalysis A: Chemical (1996), 112(3), 437-445). Accordingly, the following influences have a positive effect on the reaction rate and the selectivity of the debenzylation: oxidic palladium, shell distribution of the palladium on the support and high metal loading. Strong and weak acids are known as modifiers in order to increase the reaction rate of the debenzylation. Thus, 4-chloro-N,N-dibenzylaniline and 4-chloro-N-benzylaniline can be converted very quickly and selectively into 4-chloroaniline by addition of catalytic amounts of HCl to the reaction mixture.

The selective conversion of 4-chloro-N,N-dibenzylaniline into 4-chloroaniline preferably takes place at a pH of less than 4 (A. David, A. Vannice, NACS Philadelphia 2005 0-36).

In the O-debenzylation of dibenzyl ether, hydrogenation is inhibited by addition of aqueous sodium hydroxide solution. On the other hand, addition of HCl results in the inhibited reaction now taking place and proceeding to completion.

In the hydrogenation of nitriles, the selectivity is influenced in a targeted manner by addition of acid (S. Nishimura, Handbook of Heterogeneous Catalytic Hydrogenation for Organic Synthesis, published by John Wiley & Sons, Inc. 2001).

In these known processes, the acid, for example hydrochloric acid, has to be added to the reaction solution in each case.

The production of Pd/C catalysts by impregnation of an activated carbon with palladium(II) chloride and subsequent reduction and washing-out of the HCl formed in the reduction (process described by Mozingo) or by precipitation of palladium chloride as palladium hydroxide on the activated carbon (process described by Pearlman) is also known (S. Nishimura, Handbook of Heterogeneous Catalytic Hydrogenation for Organic Synthesis, published by John Wiley & Sons, Inc. 2001).

Further known processes use a preneutralized palladium chloride solution which is subsequently applied to the activated carbon (U.S. Pat. No. 3,804,779).

Palladium colloids are formed during the preneutralization.

A palladium-on-activated carbon catalyst which can be used for hydrogenolysis reactions is also known (EP 1 238 700 A1). An important aspect here is that all of the noble metal is present in the form of the hydroxides and oxides.

When these catalysts are used in reactions involving hydrogen, the oxides and hydroxides are reduced to metallic palladium and water according to the following reaction equation:

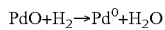

$$PdO + H_2 \rightarrow Pd^0 + H_2O$$

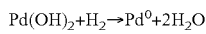

$$Pd(OH)_2 + H_2 \rightarrow Pd^0 + 2H_2O$$

No change in the pH occurs here.

To increase the reaction rate, it is necessary to add an acid in the case of these known catalysts.

The separate addition of inorganic acid to the reaction medium has the disadvantage that metering problems can occur. Furthermore, nonuniform distribution of the acid in the reaction medium can occur, so that it is not always possible to ensure that the reaction proceeds uniformly.

It is an object of the invention to provide a catalyst which produces an acid while being used in a catalytic reaction.

The invention provides a supported noble metal catalyst which is characterized in that palladium salts which are enveloped by colloids of palladium hydroxide/oxide and/or palladium hydroxide/oxide compounds have been applied to the support.

The catalyst of the invention can have a pH of less than 3, in particular from 3 to 1.5, after reduction by means of hydrogen.

The invention further provides a process for producing the supported noble metal catalyst, which is characterized in that an aqueous noble metal salt solution is hydrolysed by addition of bases, the colloidal suspension formed is applied to a support and the support is filtered off.

In the process of the invention, chloro-hydroxy-palladium colloids are produced in a targeted manner in the first step during the catalyst preparation. These colloids are then applied to the support in the second step. The chloro-hydroxy-palladium colloids produced according to the invention are insensitive to further hydrolysis of the palladium chloride.

In the process of the invention, it is possible to use palladium or a mixture of palladium with other noble metals of group VIII as noble metal for producing chloro-hydroxo colloids of the noble metals of group VIII of the Periodic Table.

Alkali metal and/or alkaline earth metal hydroxides can be used for producing the colloids.

For the purposes of the invention, it is important to use strong bases, e.g. NaOH, which lead to incomplete hydrolysis of the palladium chloride. This is achieved by setting the pH during the hydrolysis to values of preferably below 7, particularly preferably below 6.

The chloro-hydroxy-noble metal colloids obtained can be applied to a support.

As support, it is possible to use all customary supports, in particular activated carbon, carbon black, carbon aerogel, carbon nanotubes, carbon nanofibres, aluminium oxide, silicon dioxide, barium sulphate, calcium carbonate and/or titanium dioxide.

The activated carbon can have been activated by means of steam, phosphoric acid, zinc chloride or in another way.

Furthermore, a subsequently modified activated carbon as described in U.S. Pat. No. 6,992,037 or as described in WO 2006/133081 can be used.

The catalysts of the invention can be used in catalytic reactions, in particular hydrogenations, in which the use of acid is beneficial.

It has to be assumed that the chloro compounds in the interior of the colloids are protected by the envelope of hydroxo compounds, as illustrated in FIG. 1. Under hydrogenation conditions, both the hydroxy-palladium complexes and the chloro-palladium complexes are reduced. This forms HCl, resulting in a decrease in the pH.

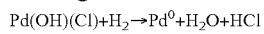

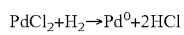

The catalysts produced in this way generate an acid during the catalytic hydrogenation and bring about a significantly higher reaction rate for catalytic hydrogenations.

The catalysts of the invention are particularly useful for the deprotection of benzyl ethers, benzylamines, dibenzylamines, benzyl alcohols, benzyl acetals, benzyl-protected amino acids and peptides, etc. The removal of other protective groups, e.g. N-benzyloxycarbonyl groups (Z or Cbz), 9-fluorenylmethoxycarbonyl (Fmoc), etc., is also possible.

A summary overview of protective groups which can be removed by means of the heterogeneous catalysts of the invention is given by the monograph by Kocienski (Protecting Groups, 3rd Edition, 2005, Georg Thieme Verlag Stuttgart).

The protective groups are used in the organic synthesis of intermediates and end products for life science and fine chemicals. The production of pharmaceutical products, herbicides and insecticides, in particular, often requires the use of a protective group which has to be removed again during or at the end of the synthesis.

BRIEF DESCRIPTION OF THE DRAWINGS

FIG. 1 illustrates the reduction of the chloro-hydroxy-palladium colloids to Pd(0) and HCl.

FIG. 2 is a graph of hydrogen uptake vs. reaction time in the hydrogenation of dibenzyl ether

EXAMPLES

Example 1

Unreduced Palladium on Activated Carbon Catalyst According to the Invention

Production of a Solution of Chloro-Hydroxy-Palladium Colloid

A solution comprising 500 ml of deionized water and 5.00 g of palladium as palladium(II) chloride was admixed with 45 ml of a 10% strength sodium hydroxide solution at room temperature while stirring. The solution was stirred for a further 30 minutes. A pH of 6.0 was established.

Fixing of the Chloro-Hydroxy-Palladium Colloids to an Activated Carbon Support

The chloro-hydroxy-palladium colloids formed are precipitated on the support by addition of this solution to a suspension of 95.0 g of commercially available activated carbon in 500 ml of deionized water. The suspension was subsequently heated to 80° C. The suspension was then filtered hot and subsequently washed with 1000 ml of deionized water.

The unreduced catalyst obtained in this way had a palladium content of 5.0%. It has a pH of 3.7. After reduction with hydrogen, the catalyst has a pH of 2.3.

Example 2

Reduced Palladium on Activated Carbon Catalyst (Comparison)

A reduced 5% palladium-on-activated carbon catalyst was produced by a method based on U.S. Pat. No. 3,804,779 (Kent and Evans 1974).

A solution comprising 500 ml of deionized water and 5.00 g of palladium as palladium(II) chloride was admixed with 50 ml of a 10% strength sodium carbonate solution at room temperature while stirring and stirred for a further 2 hours. At the end of the stirring time, a pH of 5.85 had been established.

This solution was then introduced into a suspension of 95 g of activated carbon in 500 ml of deionized water. The hydrolysis was completed by heating to 80° C. The catalyst was reduced by means of formaldehyde. The suspension was filtered hot and the solid was subsequently washed with 1000 ml of deionized water.

The reduced catalyst obtained in this way had a palladium content of 5.0%.

Example 3

Unreduced Palladium on Activated Carbon Catalyst (Comparison)

The preparation was carried out by a method analogous to Example 2, except that the catalyst was worked up without prior reduction. This gives an unreduced catalyst having a palladium content of 5.0%.

The catalyst has a pH of 5.0. After reduction with hydrogen, the pH is 3.6.

Use Example 1

The catalysts produced as described in Example 1-3 were tested in the debenzylation of dibenzyl ether. From Example 1+3, the unreduced catalyst was used. In each case, 60 mmol of dibenzyl ether was dissolved in 100 ml of THF. This solution was hydrogenated in the presence of 200 mg of the catalysts described at a pressure of 1 bar of hydrogen and a temperature of 25° C. The reaction times to complete conversion were determined. Table 1 shows the results in detail:

| Catalyst | Reaction time [min] | $H_2$ consumption [ml] |
| --- | --- | --- |
| Example 1 | 22 | 2200 |
| Example 2 | no activity | 0 |
| Example 3 | 58 | 1900 |

In addition, the hydrogen consumption during the reaction was plotted (FIG. 2). It can be seen very clearly that the catalyst according to the present invention is significantly more active than the catalysts according to the prior art.

Analogously to the examples presented here, the invention can also be applied to other processes in which a positive effect on the catalytic reaction is observed as a result of addition of acid. The method of producing the catalyst can also be applied to other noble metals and should not remain restricted only to palladium. cm The invention claimed is:

The invention claimed is:

1. A supported noble metal catalyst, comprising a palladium salt and colloids of palladium hydroxide/oxide and/or palladium hydroxide/oxide compounds that envelop said palladium salt and wherein said palladium salt and said colloids are on a support, wherein:
   a) prior to the use of said supported noble metal catalyst to catalyze a reaction, the palladium on said supported noble metal catalyst is in the form of unreduced palladium (II); and
   b) said catalyst has a pH of less than 3 after reduction by hydrogen.

2. The supported noble metal catalyst of claim 1, wherein said palladium salt is palladium chloride and said colloids are chloro-hydroxy-palladium colloids.

3. The supported noble metal catalyst of claim 1, wherein said support is selected from the group consisting of: activated carbon, carbon black, carbon aerogel, carbon nanotubes, carbon nanofibres, aluminium oxide, silicon dioxide, barium sulphate, calcium carbonate and titanium dioxide.

4. The supported noble metal catalyst of claim 1, wherein said palladium salt and said colloids have been precipitated onto said support.

5. The supported noble metal catalyst of claim 2, wherein said support is selected from the group consisting of: activated carbon, carbon black, carbon aerogel, carbon nanotubes, carbon nanofibres, aluminium oxide, silicon dioxide, barium sulphate, calcium carbonate and/or titanium dioxide.

6. The supported noble metal catalyst of claim 5, wherein said palladium salt and said colloids have been precipitated onto said support.

7. The supported noble metal catalyst of claim 6, wherein said support is activated carbon.

8. A process for producing the supported noble metal catalyst of claim 1 comprising:
   a) hydrolyzing an aqueous noble metal salt solution by the addition of a strong base to form a colloidal suspension, wherein hydrolysis takes place at a pH below 7;
   b) applying said colloidal suspension to a support to form said supported noble metal catalyst;
   c) separating said supported noble metal catalyst from said colloidal suspension.

9. The process of claim 8, wherein said noble metal salt solution comprises a chloride salt of a noble metal.

10. The process of claim 8, wherein said noble metal salt solution comprises palladium chloride.

11. The process of claim 8, wherein said base is an alkali metal hydroxide or alkaline earth metal hydroxide.

12. The process of claim 8, wherein said support is selected from the group consisting of: carbon black, carbon aerogel, carbon nanotubes, carbon nanofibres, aluminium oxide, silicon dioxide, barium sulphate, calcium carbonate and titanium dioxide.

13. The process of claim 8, wherein said support is activated carbon.

14. The process of claim 8, comprising:
   a) hydrolyzing an aqueous solution comprising palladium chloride by the addition of an alkali metal hydroxide or alkaline earth metal hydroxide to form a suspension of chloro-hydroxy-palladium colloids, wherein hydrolysis takes place at a pH below 7;
   b) combining said suspension with said support so as to precipitate said chloro-hydroxy-palladium colloids onto said support and thereby form said supported noble metal catalyst;
   c) separating said supported noble metal catalyst from said suspension.

15. The process of claim 14, wherein the separation of step c) is performed by removing said supported noble catalyst from said suspension by filtration.

16. The process of claim 15, wherein said support is selected from the group consisting of: carbon black, carbon aerogel, carbon nanotubes, carbon nanofibres, aluminium oxide, silicon dioxide, barium sulphate, calcium carbonate and/or titanium dioxide.

17. The process of claim 15, wherein said support is activated carbon.

18. A method of producing an acid during a hydrogenation reaction, comprising catalyzing said reaction with the supported noble metal catalyst of claim 2, wherein said reaction is performed under hydrogenation conditions resulting in the reduction of palladium.

19. The method of claim 18, wherein said reaction is a debenzylation reaction.

20. The method of claim 19, wherein said reaction comprises the debenzylation of a benzyl ether.

* * * * *